Oct. 23, 1923.
C. N. KAHL
HYDRAULIC CLUTCH
Filed May 4, 1921
1,471,338
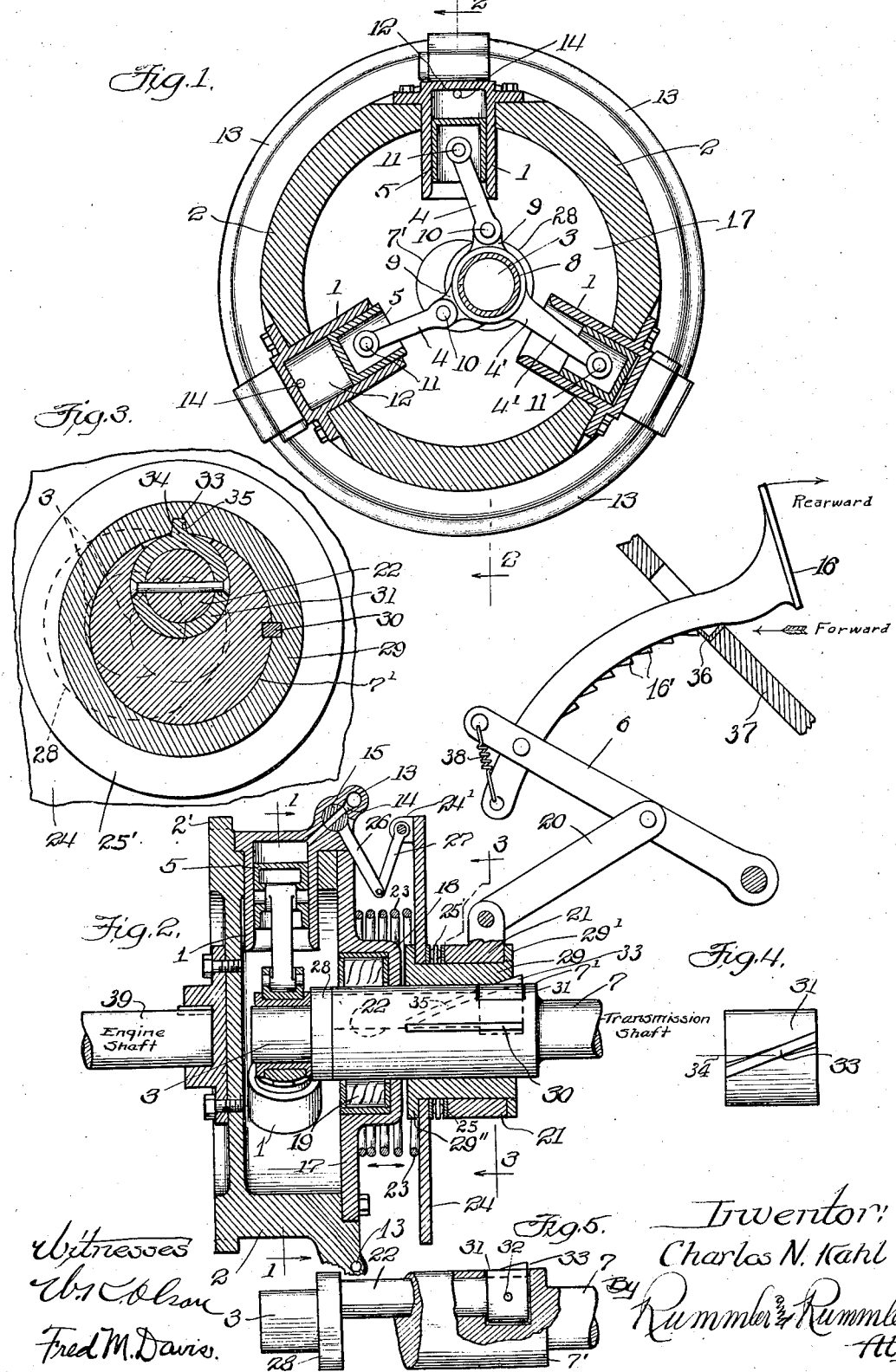

Patented Oct. 23, 1923.

1,471,338

UNITED STATES PATENT OFFICE.

CHARLES N. KAHL, OF JACKSONVILLE, ILLINOIS.

HYDRAULIC CLUTCH.

Application filed May 4, 1921. Serial No. 466,853.

*To all whom it may concern:*

Be it known that I, CHARLES N. KAHL, a citizen of the United States of America, and a resident of Jacksonville, county of Morgan, and State of Illinois, have invented certain new and useful Improvements in Hydraulic Clutches, of which the following is a specification.

This invention relates to certain improvements in hydraulic clutches and variable speed transmissions, being more particularly applicable to motor cars, motor trucks, tractors, launches, and machinery where a clutch of this type is of advantage.

The main objects of this invention are to provide an improved clutch whereby any ratio of speed between the motor and the transmission shaft may be obtained and maintained without damage to or wear on the mechanism; to provide such a device which will be positive in its locked position, that is to say, will function without slippage, and which will have no dragging effect when in a released position; to provide a device of this character in which the resistance to flow and the amount of flow of oil may be varied in combination, in such a manner that any degree of clutch action from no torque whatever to a positive drive may be available over an indefinite period of time without strain or appreciable wear on the clutch.

The device is essentially a hydraulic clutch which utilizes for its clutching action the frictional resistance offered by a manually variable orifice to the flow of oil impelled by a manually controlled pump.

While this clutch is intended primarily for use in automobiles, motor trucks and tractors, it is equally suitable for any installation where a clutch which may be slipped continuously without damage, is of advantage.

By placing a ratchet on the clutch pedal any degree of slipping may be constantly maintained on occasion where because of mud or long hills the motor is not capable of driving the car with the normal ratio of engine speed to rear wheel speed.

An illustrative embodiment of this invention is shown in the accompanying drawings, in which—

Figure 1 is a cross section on the line 1—1 of Fig. 2, being in the plane of the pump cylinder axes.

Fig. 2 is an axial section on the line 2—2 of Figure 1.

Fig. 3 is an enlarged fragmentary view showing a cross section at the line 3—3 of Fig. 2.

Fig. 4 is a side view of the sliding control member on the shaft.

Fig. 5 is an assembly view of the crank shaft and transmission head with part of the latter broken away.

In the construction shown, the device comprises a plurality of cylinders 1 set radially in and attached rigidly to the fly wheel 2, three such cylinders being well adapted for the purpose, and all being connected to operate as pumps, subject to proper control of piston throw and fluid circuit resistance, as they revolve at all times with the flywheel, which is connected to the motor or engine, not shown.

The crank-pin 3 on which the connecting rods 4 and 4' bear is adjustable and is so supported and controlled that its eccentricity may be varied from a maximum to zero, at which latter point there is no displacement or movement of the pistons 5 in said cylinders, and consequently no drag on the clutch, which may then be said to be "open." The degree of eccentricity and the consequent pumping action and corresponding displacement and circulation of oil, or other fluid, is regulated by the pedal controlled clutch lever 6, as will be explained, and the speed of the transmission shaft 7 is controlled accordingly.

The one common crank-pin 3 carries a sleeve 8 having lugs 9 with pivots 10 for two of the rods and the third or master rod 4' is rigid therewith. The outer end of each rod is pivoted at 11 to the corresponding piston. The heads 12 of these cylinders are so connected permanently by pipes 13 having branches 14 that oil may flow from one cylinder to another. In these branches are valves 15 so linked that they may be opened or closed to a greater or less degree by movement of the clutch pedal 16.

The flywheel 2 is concentric with the shaft 7 and is rotatable relative thereto. For this purpose it is provided with a centrally perforated end plate 17 having a chambered hub 18 containing bearing rollers 19 to coact with the enlarged shaft end 7'.

When the pin 3 is in its neutral axial position as shown in Figs. 2 and 3 the pumps are idle and the flywheel turns freely relative to shaft 7. But when the pin 3 is moved to an eccentric position as shown in Fig. 1, and by dotted lines in Fig. 3 any movement of the flywheel relative to said shaft 7 actuates the pump and throws a drag on the clutch and tends to rotate said shaft. The degree of drag or torque is proportional to three factors, namely, the engine speed, eccentricity of pin 3 and the throttling effect of pipes 14 and valves 15. In the embodiment shown it is arranged that the choking effect of said valves and the crank pin eccentricity shall be increased at the same time and by the same controlling means as will be explained.

The crank pin 3 and valves 15, in the embodiment here shown, are both controlled by the pedal 16 through connections 6, 20 and 21. The pedal 16, when actuated positively, to synchronize or speed up the shaft 7, pushes forwardly on the lever 6 and it in turn thrusts forwardly on the link 20, and this urges the non-rotary sleeve 21 forwardly on shaft 7 which turns freely therein.

The sleeve 21 has two functions, namely, to rotate (indirectly as will be explained) the shaft 22 which carries crank pin 3, and to urge the valve controlling mechanism to its non-throttling or valve opening position. (See Fig. 2).

The forward movement of sleeve 21 is opposed by the helical compression spring 23 which reacts oppositely between the flywheel plate 17 and the coturning plate 24. Antifriction bearings 25 are interposed between said plate 24 and the non-rotary sleeve 21, so as to provide for frictionless transmission of controlling force from one to the other.

Each of the valves 15 is provided with a lever stem 26 the free end of which is connected by a link 27 to a lug 24' on the plate 24, so arranged as shown in Fig. 2 as to close or restrict the fluid passageway when the pedal 16 is released and moved rearwardly.

The crank-pin 3 which is normally coaxial with shaft 7, is carried by a disk-like crank arm 28 on the forward end of the small shaft 22, which shaft is embedded eccentrically in and near the surface of the shaft head 7' and parallel with shaft 7. The head 7' is provided on its rear end with a sleeve 29 splined thereto at 30. Said sleeve 29 is slidable axially on said head and rotates therewith. It directly supports the non-rotary sleeve 21 which controls its longitudinal movement. Shoulders 29' and 29'' are provided on sleeve 29 to retain the members 21, 24 and 25 snugly together thereon, one of said shoulders being removable for which purpose it may be in the form of a nut, as for instance 29'.

Said shaft 22 has a sleeve 31 pinned at 32 to its rear end, which sleeve has a helical spline 33 on its outer face. The spiral pitch of said spline is or may well be about 25 degrees relative to a sleeve tangent line intersected thereby. Said sleeve 31 and head 7' are tangent to the same plane, as at 34 and the spline 33, which occupies a peripheral arc of only a few degrees (about 10°) is mainly disposed at or near the said tangent line 34.

The sleeve 29 has a helical inner groove 35 corresponding with the spline 33 which coacts therewith to oscillate the shaft 22 according to the longitudinal movements of sleeve 29. Hence movement of the pedal 16 turns shaft 22 relative to sleeve 29 and shaft 7 and so varies the eccentricity of crank-pin 3.

It is to be understood that in the case of heavy slow-speed trucks the engine instead of being directly connected to the flywheel 2, as indicated in Fig. 2, may be geared thereto as will be understood, though not shown, in which case the flywheel may be provided with gear teeth at 2' for coaction with a small engine driven pinion, not shown. In order to minimize the variety of necessary stock forms in the factory the wheel 2 may to advantage be formed both with a key slot and with gear teeth.

The operation of the clutch is as follows: With the engine running and the vehicle standing still, the pedal 16 is in its forward position as shown in Figure 2, the valves 15 being wide open and the crank pin 3 being coaxial with shaft 7. The clutch is now dead, and develops no drag. In starting the vehicle, the pedal 16, having ratchet teeth 16' is raised by lifting with the foot and is so released from the latch shoulder 36 on the dash 37 and permitted to move backward toward the operator as indicated by the arrow, responsive to spring 23. The position of the pedal may be set at any desired point by letting it drop by gravity, assisted by spring 38 so as to engage one of the notches 16' with the stop shoulder 36 on the footboard 37. The said movement of the pedal 16 causes the sleeve 29 to move backwardly thereby operating both on the helical spline 33 to effect or increase eccentricity of the pin 3 and to restrict or close the valves 15. When the pedal is fully released, the pin 3 reaches its maximum of eccentricity, as in Fig. 1, and the valves 15 become entirely closed, at which time the pumps have a maximum range of piston throw and the leakage from one cylinder to another is a minimum, or substantially zero, with the consequence that the transmission shaft 7 runs substantially in synchronism with the engine shaft 39.

In this position the virtual effective crank arm of shaft 7 that is to say, the distance between the parallel axes of shaft 7 and pin 3 is a maximum, and as the valves are closed the pump pistons necessarily cease to move in their cylinders. Whenever the speed ratio is less than unity the friction loss if any, developed in the pumps and oil flow is so low as to be negligible.

Any intermediate ratio of speeds may be obtained by adjusting the position of the pedal 16 and corresponding positions of the pin 3 and valves 15, the former ranging back to its neutral no load axial position in line with shaft 7 and the latter ranging to a fully open no-drag position as in Fig. 2.

It will be noted that on no load the engine may run freely without operating the pumps or in any degree moving the pistons in their cylinders. But on full load the pin 3 is thrown well out from its neutral position and a highly effective crank arm is in effect produced, resulting in a powerful turning leverage and corresponding thrust on rods 4 and 4' to drive shaft 7.

When the pedal 16 is set at any intermediate point, say half way there will be both pumping action and leakage at the valves 15. Increase of road resistance as in climbing a hill will automatically cause more leakage at said valves, because of the greater piston thrust force, and the speed of the vehicle will accordingly decrease somewhat.

On the other hand decrease of road resistance will diminish the piston thrust force and hence also the valve leakage and the vehicle will accordingly speed up, without any attention on the part of the chauffeur.

Although but one specific embodiment of this invention is herein shown and described, it is to be understood that numerous details of the construction shown may be altered or omitted without departing from the spirit of this invention as defined by the following claims.

I claim:

1. In a device of the character described, a pair of shafts disposed eccentrically in parallel relation one within the other with their adjacent surfaces substantially tangent to a common plane, a longitudinally movable sleeve splined on the larger of said shafts, the smaller shaft and said sleeve having interfitting helically disposed means to relatively oscillate said shafts responsive to reciprocatory movements of said sleeve on said larger shaft.

2. A device of the character described including a rotary shaft having an eccentric tubular aperture with a second shaft rotatably mounted therein, said second shaft having a crank arm with a crank-pin positioned to swing into coaxial alinement with the first-mentioned shaft, and means to adjust the relative position of said shafts.

3. A device of the character described including a rotary shaft having an eccentric tubular aperture with a second shaft rotatably mounted therein, said second shaft having a crank arm with a crank-pin positioned to swing into coaxial alinement with the first-mentioned shaft, and means to adjust the relative position of said shafts, said means comprising a helically grooved longitudinally movable sleeve splined on the first-mentioned shaft, and a spline rigid with the second-mentioned shaft to coact with said groove and so oscillate the last mentioned shaft according to the movement of said sleeve.

4. A clutch device adapted for transmitting power from one rotary member to another, subject to manual control of the speed ratio, comprising a transmission shaft to receive the power, a discoidal member adapted to serve as a fly wheel mounted coaxially on said shaft in rotatable relation thereto, a plurality of pumps of the cylinder and piston type mounted in said discoidal member, fluid conducting means interconnecting the heads of the cylinders of said pumps, an eccentric crank-pin to which said pumps are operatively connected for driving the latter as the fly wheel turns, a shaft with a crank arm thereon for supporting said crank-pin, the last-mentioned shaft being disposed eccentrically within one end of the first-mentioned shaft and parallel therewith, and non-rotary means concentric with the first-mentioned shaft and operable manually in an axial direction relative to said shafts to oscillate the second-mentioned shaft, whereby the eccentricity of said crank-pin may be varied, and the corresponding throw of the pump pistons and extent of the pumping action may be regulated.

5. In a device of the character described, a pair of shafts disposed in alinement, and readily controlled means for transmitting power from one of said shafts to the other, said means comprising a radially positioned pump of the cylinder and piston type carried by one of said shafts and a crank-pin member carried by the other to actuate said pump, said member having a pair of oppositely disposed mutually eccentric parallel pivotal parts, one of which is disposed eccentrically in the said other shaft and the other said pivotal part being movable to and from concentricity with said shafts and serving as a crank-pin to coact with the piston of said pump, and manual control means to rotatably adjust the position of said member relative to said other shaft, whereby the eccentricity of said crank-pin may be varied.

6. In a device of the character described, a rotary shaft having a lengthwise eccentric tubular aperture, a crank-shaft disposed therein provided with an arm protruding cross-wise and with a crank-pin disposed to swing in an arc to and away from co-axial alinement with the first-mentioned shaft, and a pedal operatively arranged and connected to oscillate said crank-shaft at will.

7. A hydraulic clutch comprising a pair of coaxial rotary members having turnable relation one to the other, the one having a variably eccentric crank-pin and the other a plurality of pumps operatively connected thereto and mutually interconnected and housed in the latter of said members, means to throttle the pump connection, means to control the eccentricity of said crank-pin and non-rotary manual means connected to both of said means to coordinate their action, said manual means including a sleeve on one of said members, which member is in the form of a shaft and manual means to move same longitudinally, an annulus plate between said sleeve and the pump housing member, anti-friction bearings between said sleeve and plate, and a compression spring acting divergently between said plate and housing member, throttle actuating means carried by said plate, and helical means on said shaft coacting with said sleeve to oscillate said crank-pin and so vary its eccentricity.

Signed at Chicago this 26th day of April, 1921.

CHARLES N. KAHL.